US010986002B1

(12) United States Patent
Tangella et al.

(10) Patent No.: US 10,986,002 B1
(45) Date of Patent: Apr. 20, 2021

(54) CENTRALIZING ENTERPRISE-SPECIFIC INFORMATION ACROSS CLOUD-BASED SYSTEMS

(71) Applicant: EMC IP Holding Company LLC, Hopkinton, MA (US)

(72) Inventors: Brahma Sandhi S Tangella, Brighton, MA (US); Darryl Smith, Medfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 15/802,928

(22) Filed: Nov. 3, 2017

(51) Int. Cl.
*H04L 12/26* (2006.01)
*H04L 12/24* (2006.01)
*H04L 29/08* (2006.01)

(52) U.S. Cl.
CPC ............ *H04L 43/045* (2013.01); *H04L 41/12* (2013.01); *H04L 41/22* (2013.01); *H04L 41/08* (2013.01); *H04L 43/065* (2013.01); *H04L 67/1097* (2013.01); *H04L 67/12* (2013.01); *H04L 67/306* (2013.01)

(58) Field of Classification Search
CPC ....... H04L 41/12; H04L 41/22; H04L 43/045; H04L 41/085; H04L 41/08; H04L 43/028; H04L 43/065; H04L 67/306; H04L 67/1097; H04L 67/12; H04N 1/00509
USPC .................................................. 715/734, 745
See application file for complete search history.

(56) References Cited

U.S. PATENT DOCUMENTS

| | | | | |
|---|---|---|---|---|
| 10,505,825 B1 * | 12/2019 | Bettaiah | .............. | H04L 43/04 |
| 10,528,522 B1 * | 1/2020 | Todd | .................. | G06Q 10/10 |
| 2014/0149973 A1 * | 5/2014 | Walter | ................. | G06F 8/654 |
| | | | | 717/170 |

(Continued)

OTHER PUBLICATIONS

Mahmoodpour et al., Role-based visualization of industrial IoT-based systems, 2018 IEEE, https://ieeexplore.IEEE.org/stamp/stamp.jsp?tp=&arnumber=8449183, pp. 1-8. (Year: 2018).*

(Continued)

*Primary Examiner* — Gregory G Todd
(74) *Attorney, Agent, or Firm* — Ryan, Mason & Lewis, LLP (57) ABSTRACT

An apparatus in one embodiment comprises a processing platform that includes a plurality of processing devices each comprising a processor coupled to a memory. The processing platform is configured to implement at least a portion of one or more cloud-based systems. The processing platform comprises a data consolidation module configured to compile enterprise source data from cloud-based systems associated with an enterprise, and user device data from user devices connected through networks associated with the enterprise. The processing platform also comprises a user profile builder module configured to determine user-specific parameters related to data access and enterprise resources, and build user profiles for multiple enterprise users based on the determined parameters. Additionally, the processing platform further comprises a user-specific enterprise view generator module configured to generate an interactive user-specific output of portions of the enterprise source data and user device data for the enterprise users based on the user profiles.

20 Claims, 5 Drawing Sheets

(56) References Cited

U.S. PATENT DOCUMENTS

2017/0242560 A1\* 8/2017 Goldstein ............. G06F 3/1454
2017/0242914 A1\* 8/2017 Gao ...................... G10L 15/265
2019/0044826 A1\* 2/2019 Flores Guerra ......... H04L 41/22
2019/0102719 A1\* 4/2019 Singh .................. H04L 41/5025

OTHER PUBLICATIONS

ServiceNow.com, "Work at Lightspeed" Homepage, Oct. 6, 2017, Retrieved from https://web.archive.org/web/20171006170716/http://www.servicenow.com/ (Year: 2017).\*

\* cited by examiner

CENTRALIZING ENTERPRISE-SPECIFIC INFORMATION ACROSS CLOUD-BASED SYSTEMS

FIELD

The field relates generally to information processing systems, and more particularly to techniques for consolidating virtual resources in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for accessing different portals and/or systems to generate a 360-degree view of enterprise hardware and software information.

SUMMARY

Illustrative embodiments of the present invention provide information processing systems configured to centralize enterprise-specific hardware and software information across cloud-based systems.

In one embodiment, an apparatus comprises a processing platform that includes a plurality of processing devices each comprising a processor coupled to a memory. The processing platform is configured to implement at least a portion of one or more cloud-based systems. The processing platform further comprises a data consolidation module configured to compile enterprise source data from one or more of the cloud-based systems that are associated with the enterprise, and to compile user device data from multiple user devices connected through one or more networks associated with the enterprise. The processing platform also comprises, a user profile builder module configured to determine, for multiple enterprise users, one or more user-specific parameters related to data access and one or more user-specific parameters related to enterprise resources, and to build user profiles for the multiple enterprise users based on the determined user-specific parameters related to data access and the determined user-specific parameters related to enterprise resources. Additionally, the processing platform further comprises a user-specific enterprise view generator module configured to generate an interactive user-specific output of at least a portion of the enterprise source data and at least a portion of the user device data for at least one of the multiple enterprise users based on the user profiles.

Illustrative embodiments can provide significant advantages relative to conventional fractured user experiences drawn across multiple platforms with varying degrees of information and engagement availability. For example, challenges associated with such conventional approaches are overcome through leveraging big data to create a single portal of heterogeneous data. Such a single portal can additionally provide personalization and customization based on user and enterprise parameters.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
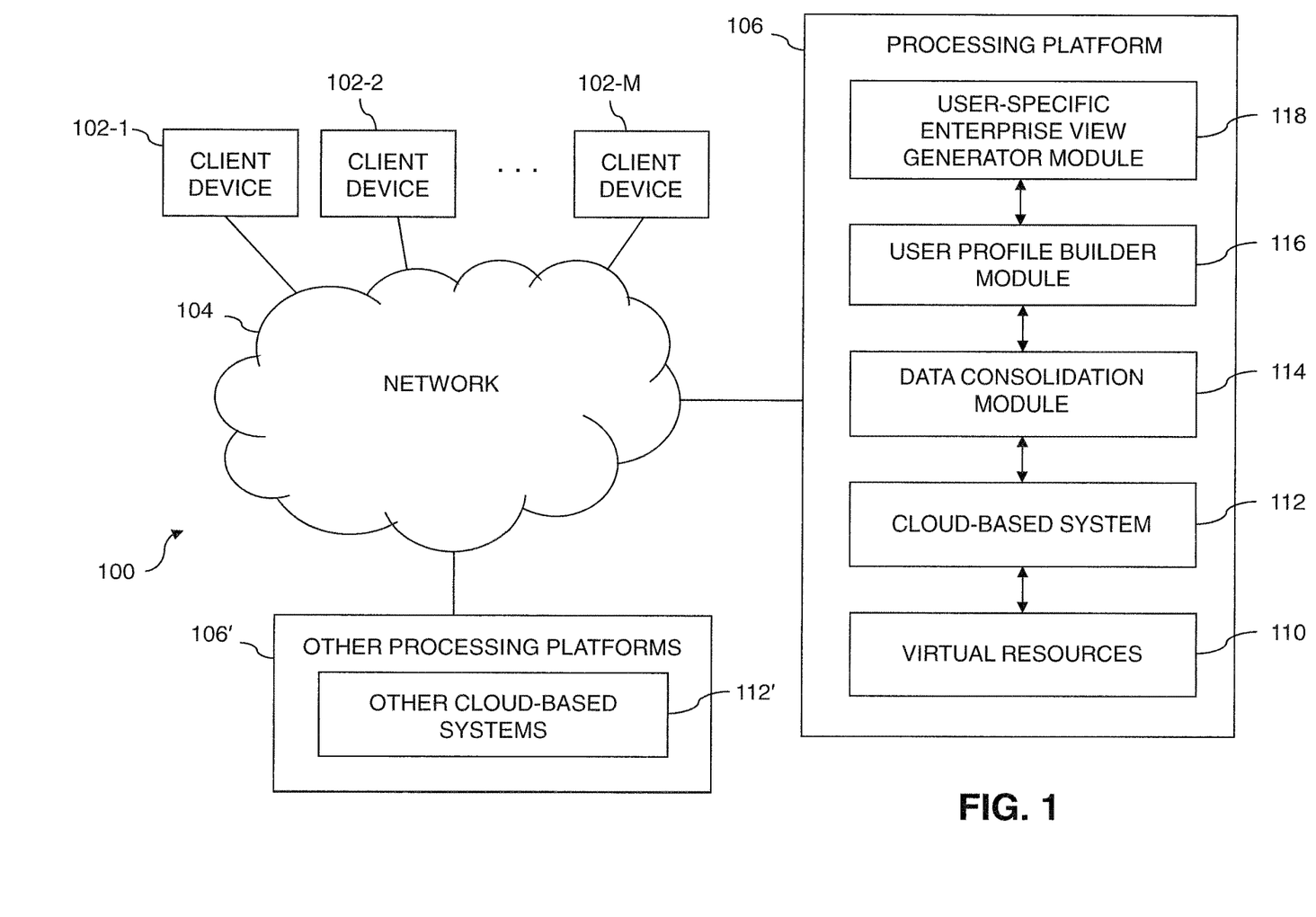
FIG. 1 is a block diagram of an information processing system configured for centralizing enterprise-specific information across cloud-based systems in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises a data consolidation module 114, a user profile builder module 116 and a user-specific enterprise view generator module 118, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The data consolidation module 114 is configured to compile enterprise source data from one or more of the cloud-based systems that are associated with an enterprise, and to compile user device data from multiple user devices connected through one or more networks associated with the enterprise. The user profile builder module 116 is configured to determine, for multiple enterprise users, one or more user-specific parameters related to data access and one or more user-specific parameters related to enterprise resources, and to build user profiles for the multiple enterprise users based on the determined user-specific parameters related to data access and the determined user-specific parameters related to enterprise resources. The user-specific enterprise view generator module 118 is configured to generate an interactive user-specific output of at least a portion of the enterprise source data and at least a portion of the user device data for at least one of the multiple enterprise users based on the user profiles.

An exemplary process utilizing data consolidation module 114, user profile builder module 116, and user-specific enterprise view generator module 118 of the processing platform 106 in information processing system 100 will be described in more detail with reference to the flow diagram of FIG. 3.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 4 and 5. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 3.

As detailed herein, at least one embodiment of the invention can include developing a secure mobile-based application to provide enterprise users/customers (such as, for example, data center operators, administrators, chief information officers, etc.) and internal technology resources (such as, for example, sales, services, chief compliance officer, senior leadership, etc.) efficient access to distributed information through voice, scan and/or search-based capabilities based on the security roles defined for each such user.

In one or more embodiments of the invention, multiple streams and/or sources of distributed enterprise data (such as, for example, hardware-related data and software-related data, enterprise resource planning (ERP), master data management (MDM), one or more internal enterprise applications, one or more enterprise cloud-based applications, and one or more external data sources) can be consolidated into an enterprise data lake. As used herein, a data lake refers to a data storage system or repository, wherein heterogeneous data from across one or more systems and/or platforms can be stored in a natural format, which can include raw data and/or data that has been transformed for use in one or more particular tasks. The data lake can also facilitate the collocation of the stored data in one or more structural forms. By way of example, some or all of the distributed data can be gathered from one or more legacy systems.

Additionally, in one or more embodiments of the invention, all enterprise data movement into, through, and out of a processing platform as detailed herein can be publish-subscribe pattern (pub-sub) enabled. This can include, in such an embodiment, streaming, micro-batch, and batch data with eventing, as well as data under service level agreements (SLAs) for refresh, quality, sharability, performance, etc. Further, such an embodiment can also include providing data catalog and lineage information to one or more governance entities.

Figure 2:
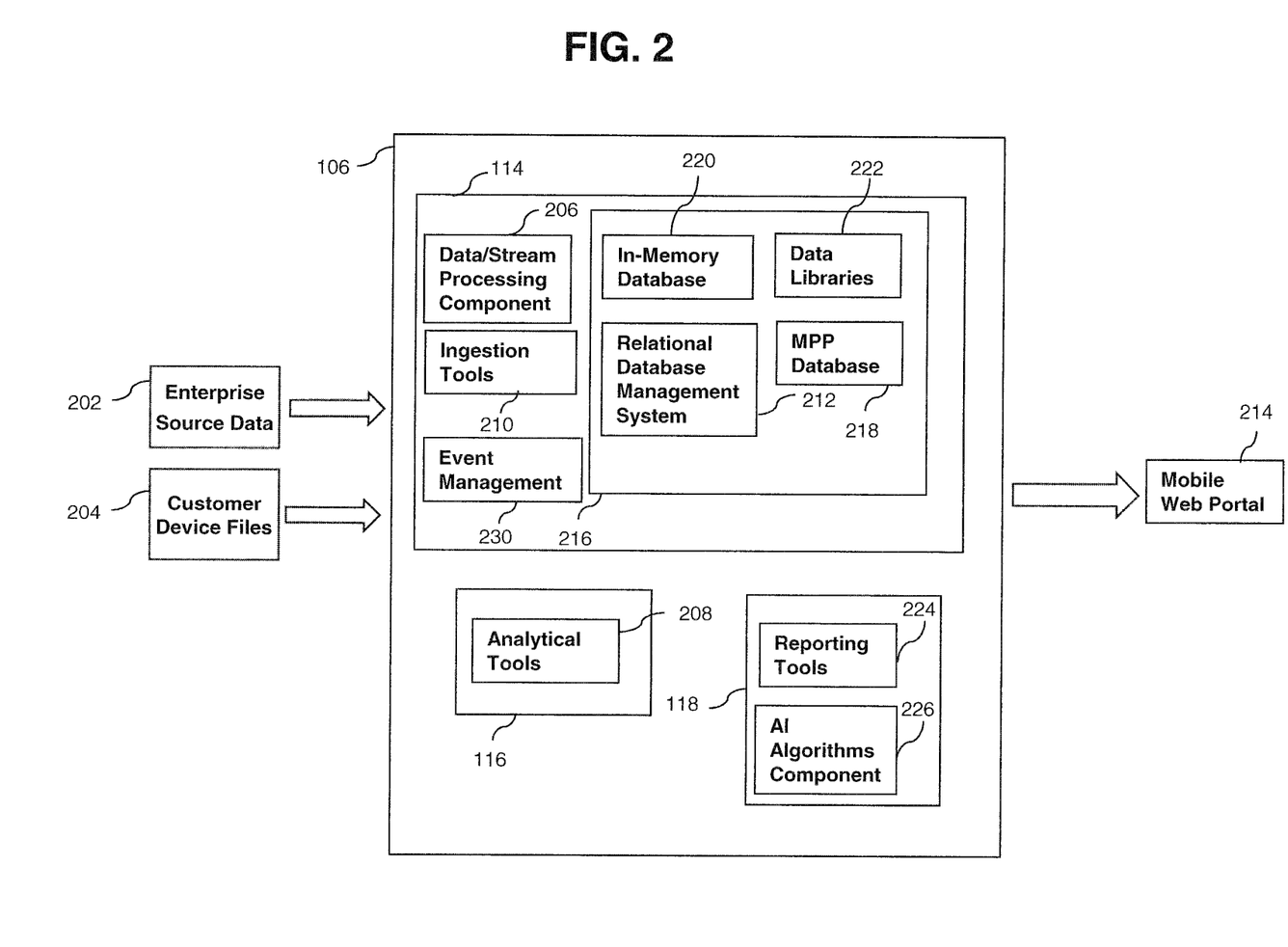
FIG. 2 shows example system architecture for centralizing enterprise-specific information across cloud-based systems via a web portal in an illustrative embodiment.

FIG. 2 shows example system architecture for centralizing enterprise-specific information across cloud-based systems via a web portal in an illustrative embodiment. By way of illustration, FIG. 2 depicts a view of componentry within an example iteration of processing platform 106. In such an example embodiment, processing platform 106 (which can, as further detailed herein, include infrastructure including one or more servers, central processing units, as well as storage and networking components) obtains enterprise source data 202 and customer device files 204. The enterprise source data 202 can include internal transaction systems (structured data), while the customer device files 204 can include dial-home (unstructured) data received from storage devices at customer locations, which are hosted on internal clouds. By way of example, the received data can include user and/or customer data including corresponding install bases (which represent measures of the number of units of a product or service that are in use in connection with a particular user/customer). The received data can be processed by data consolidation module 114, which can include and/or host technologies such as a data/stream processing component 206, ingestion tools 210, an event management component 230, and a storage component 216. The event management component 230 can, for example, send alerts based on the data flowing through the data/stream processing component 206. The storage component can include, for example, a relational database management system 212, a massively parallel processing (MPP) database 218, an in-memory database 220, and one or more data libraries 222.

The example processing platform 106 depicted in FIG. 2 can also include user profile builder module 116, which can include one or more analytical tools 208. Additionally, processing platform 106 can also include user-specific enterprise view generator module 118, which can include one or more reporting tools 224 and an artificial intelligence (AI) algorithms component 226. Outputs (such as alerts, mobile push notifications, and/or parsed device inventories, for example) generated by the processing platform 106 can be delivered to a mobile web portal 214, wherein, for example, an end-user can access the output via a mobile device application. Additionally, in an example embodiment implemented in accordance with FIG. 2, the user-specific enterprise view generator module 118 can apply one or more AI algorithms via component 226 to deliver one or more outputs and/or outcomes requested by an end-user (for example, requested via an application programming interface (API) embodied within a mobile device application).

By way of example, the algorithms implemented via component 226 can include statistical and machine learning algorithms for determining the health of one or more items of enterprise hardware and/or software, recommendations for improving utilization and/or stability of existing enterprise hardware/software, and determining customer propensities with respect to one or more enterprise offerings.

By way merely of illustration and not limitation, implementation of one or more embodiments of the invention can provide user/customer capabilities (that is, abilities that the single platform will bring to the user/customer) including, for example, management of all open and recent service requests, a view of the current state and any open issues with any enterprise hardware or software product, a view of data center recommendations on improving utilization/stability of enterprise hardware and/or software, a view of varied performance metrics, and the ability to configure mobile alerts for service requests, performance metrics, alerts, technician arrivals, etc.

Similarly, implementation of one or more embodiments of the invention can provide additional capabilities including account management, maintenance renewals and/or hardware refreshes, a view of a current install base, entitlements, current hardware and software versions, a view of technical support information, a view of marketing information, and one or more operational views.

As noted herein, the operation of the information processing system 100 is described in further detail with reference to the flow diagram of the example embodiment of FIG. 3. The process as shown includes steps 300 through 312, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 300, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 302, at least a portion of one or more cloud-based systems are implemented within the processing platform. For example, with reference to the FIG. 1 embodiment, virtual resources 110 of cloud-based system 112 are implemented within the processing platform 106. As mentioned previously, such virtual resources (or portion(s) of at least a cloud-based system) illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 304, enterprise source data are compiled from one or more of the cloud-based systems that are associated with an enterprise. Such a step can be carried out, for example, by data consolidation module 114 in the FIG. 1 embodiment. The enterprise source data can include, for example, service request information, information pertaining to hardware associated with the enterprise, and/or information pertaining to software associated with the enterprise.

In step 306, user device data are compiled from multiple user devices connected through one or more networks associated with the enterprise. Such a step can also be carried out, for example, by data consolidation module 114 in the FIG. 1 embodiment. In one or more embodiments of the invention, the one or more networks include an Internet of things network, and the multiple user devices include multiple Internet of things-enabled user devices. Additionally, the user device data can include, for example, performance information attributed to at least one of the multiple user devices and/or upgrade statuses attributed to at least one of the multiple user devices.

In step 308, one or more user-specific parameters related to data access and one or more user-specific parameters related to enterprise resources are determined for multiple enterprise users. Such a step can be carried out, for example, by user profile builder module 116 in the FIG. 1 embodiment. The user-specific parameters related to data access can include, for example, one or more data permissions associated with the multiple enterprise users. Also, the user-specific parameters related to enterprise resources can include, for example, install bases attributed to the multiple enterprise users.

In step 310, user profiles for the multiple enterprise users are built based on the determined user-specific parameters related to data access and the determined user-specific parameters related to enterprise resources. Such a step can also be carried out, for example, by user profile builder module 116 in the FIG. 1 embodiment.

In step 312, an interactive user-specific output of at least a portion of the enterprise source data and at least a portion of the user device data is generated for at least one of the multiple enterprise users based on the user profiles. Such a step can be carried out, for example, by user-specific enterprise view generator module 118 in the FIG. 1 embodiment. Also, in one or more embodiments of the invention, the user-specific enterprise view generator module can be further configured to implement one or more artificial intelligence algorithms to generate one or more user-requested outputs, as well as to display the interactive user-specific output via a user interface of one or more mobile devices in connection with a mobile software application.

Further, in at least one embodiment of the invention, the user-specific enterprise view generator module can be further configured to render a generated interactive user-specific output accessible to a corresponding enterprise user via one or more pre-determined channels. The pre-determined channels can be pre-determined based, for example, on one or more security roles defined for the enterprise user in question. Additionally, the user-specific enterprise view generator module can also be further configured to generate one or more customizable alerts for the multiple enterprise users based on the user profiles and one or more pre-defined status updates with respect to at least one of at least a portion of the enterprise source data and at least a portion of the user device data.

Figure 3:
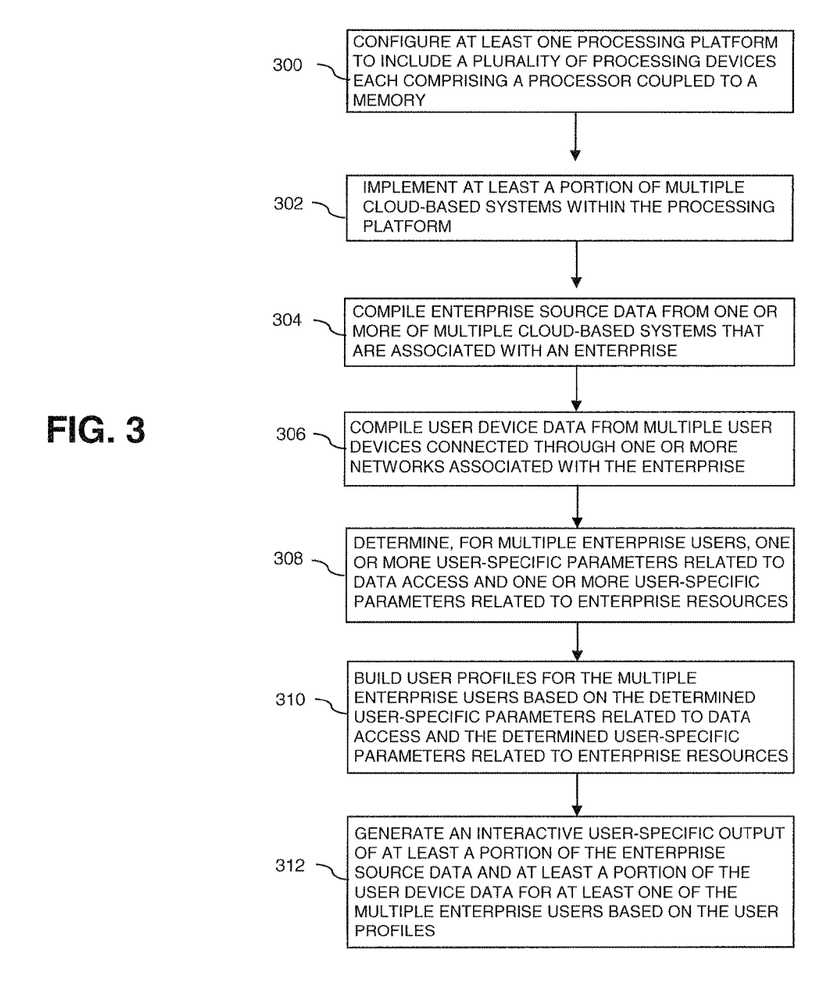
FIG. 3 is a flow diagram of a process for centralizing enterprise-specific hardware and software information across cloud-based systems in an illustrative embodiment.

The particular processing operations and other system functionality described in conjunction with the flow diagram of FIG. 3 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of centralizing enterprise-specific hardware and software information across cloud-based systems as disclosed herein can provide a number of significant advantages relative to conventional arrangements. For example, some embodiments can advantageously provide frictionless access to distributed enterprise information derived across multiple platforms and/or cloud-based systems.

Such arrangements overcome the difficulties that would otherwise be associated with conventional approaches requiring a fractured user experience spread across multiple distinct systems and/or platforms.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
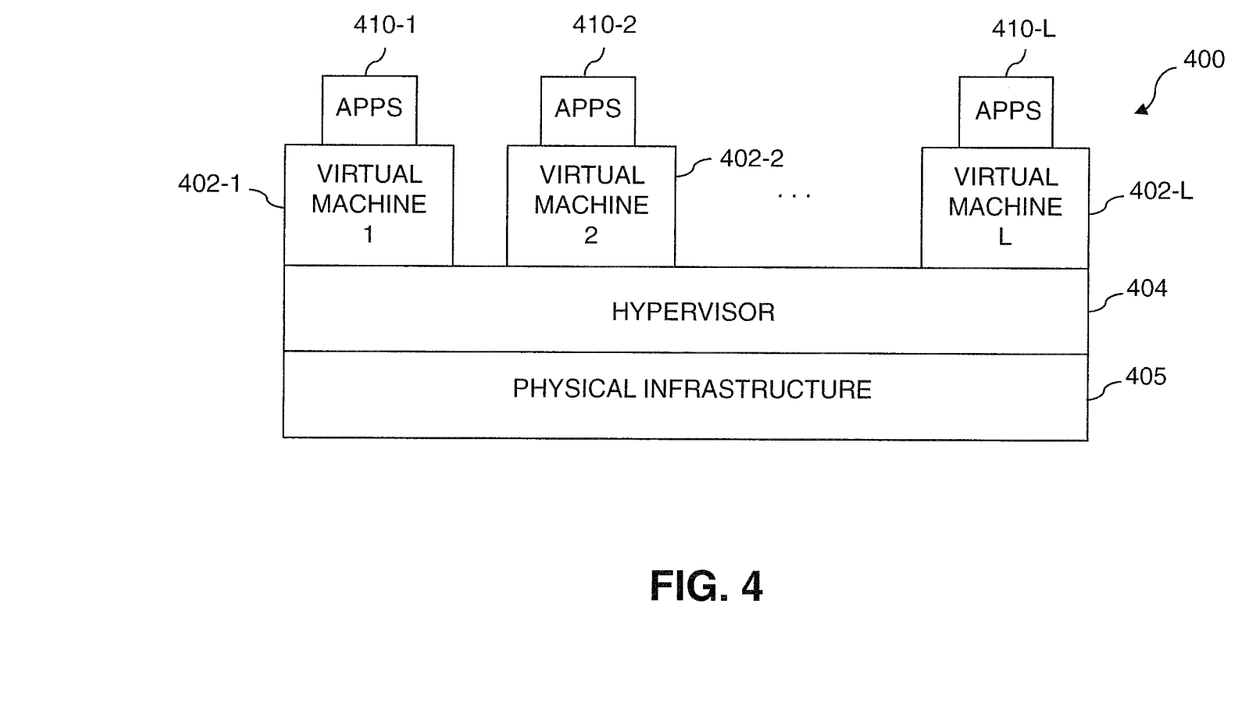
FIGS. 4 and 5 show examples of processing platforms that may be utilized to implement at least a portion of an information processing system in illustrative embodiments.
Figure 5:
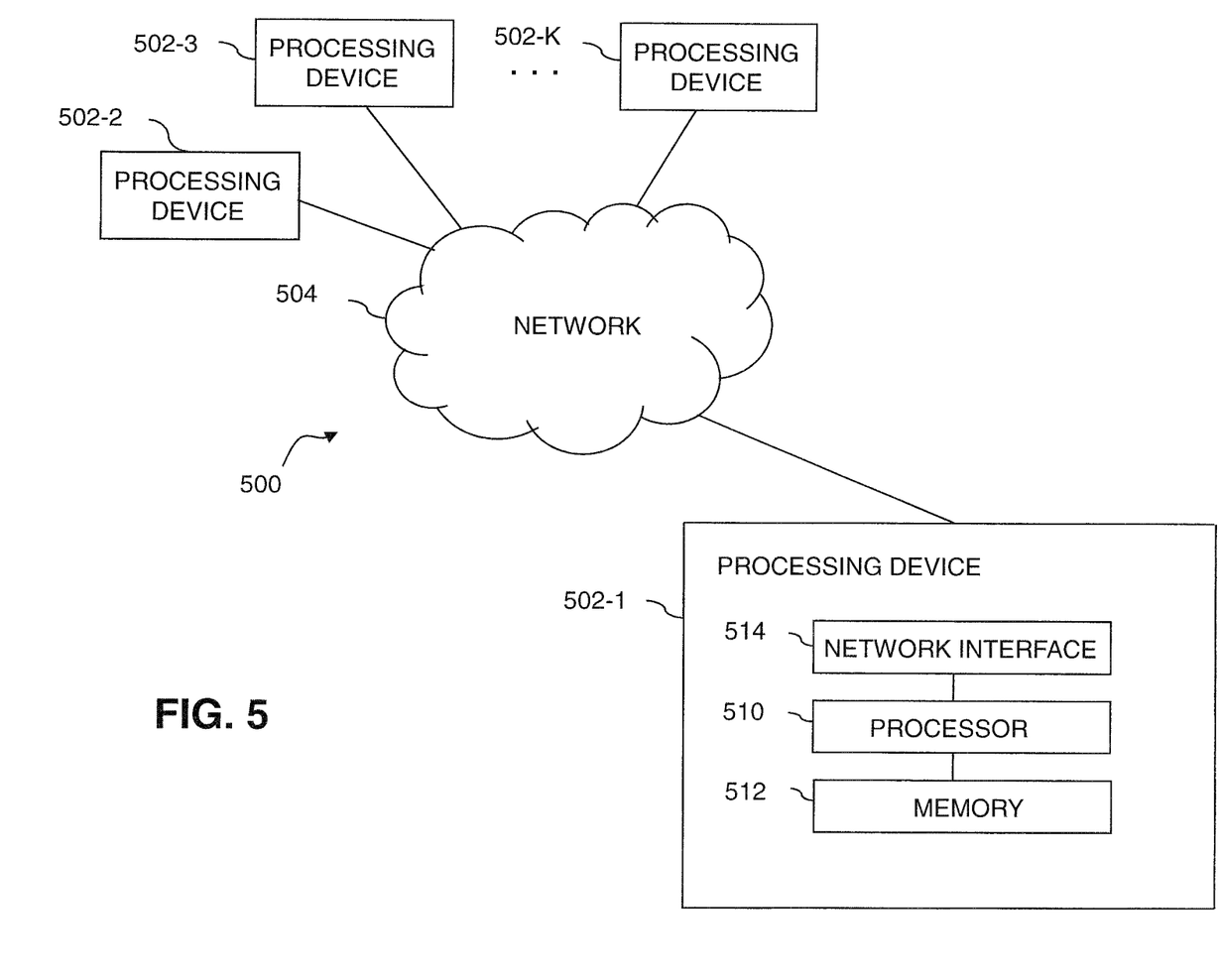

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to centralize enterprise-specific hardware and software information across cloud-based systems. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform comprising a plurality of processing devices each comprising a processor coupled to a memory;
the at least one processing platform being configured:
   to implement at least a portion of multiple cloud-based systems that are associated with an enterprise;
   to compile enterprise source data from the multiple cloud-based systems, wherein the enterprise source data comprise service request information, enterprise resource planning (ERP) data associated with the enterprise, master data management (MDM) data associated with the enterprise, information pertaining to one or more internal enterprise applications, information pertaining to one or more enterprise cloud-based applications, and data derived from one or more external data sources; and
   to compile user device data from multiple user devices connected through one or more networks associated with the enterprise, wherein the user device data comprise unstructured data from storage devices at user device locations;
   to determine, for multiple enterprise users, one or more user-specific parameters related to data access and one or more user-specific parameters related to enterprise resources, wherein the one or more user-specific parameters related to enterprise resources comprise install bases attributed to the multiple enterprise users, wherein the install bases represent measures of a number of units of one or more products and/or one or more services in use in connection with the multiple enterprise users; and to build user profiles for the multiple enterprise users based on the determined user-specific parameters related to data access and the determined user-specific parameters related to enterprise resources;

to generate an interactive user-specific output of at least a portion of the enterprise source data and at least a portion of the user device data for at least one of the multiple enterprise users based on the user profiles, wherein generating the interactive user-specific output comprises providing user capabilities, via the interactive user-specific output, including managing open service requests, viewing current state of enterprise hardware, viewing current state of enterprise software products, viewing one or more data center recommendations pertaining to improving utilization of enterprise hardware and enterprise software products, viewing multiple performance metrics, and configuring multiple mobile alerts for service requests, performance metrics, and technician-related information; and to render the generated interactive user-specific output accessible to the at least one of the multiple enterprise users via one or more mobile-based applications, wherein the one or more mobile-based applications provide access to at least some of the enterprise source data and user device data in the generated user-specific output through voice-based capabilities in connection with at least one mobile device associated with the at least one enterprise user, and wherein the access provided, to the at least one enterprise user, to the at least some of the enterprise source data and user device data in the generated user-specific output is based at least in part on one or more security roles defined for the at least one enterprise user.

2. The apparatus of claim 1, wherein the processing platform is further configured to display the interactive user-specific output via a user interface of one or more mobile devices in connection with the one or more mobile-based applications.

3. The apparatus of claim 1, wherein the one or more networks comprises an Internet of things network, and wherein the multiple user devices comprise multiple Internet of things-enabled user devices.

4. The apparatus of claim 1, wherein the one or more user-specific parameters related to data access comprises one or more data permissions associated with the multiple enterprise users.

5. The apparatus of claim 1, wherein the processing platform is further configured to generate one or more customizable alerts for the multiple enterprise users based on the user profiles and one or more pre-defined status updates with respect to at least one of at least a portion of the enterprise source data and at least a portion of the user device data.

6. The apparatus of claim 1, wherein the user device data comprise performance information attributed to at least one of the multiple user devices.

7. The apparatus of claim 1, wherein the user device data comprise upgrade statuses attributed to at least one of the multiple user devices.

8. A method comprising:

compiling enterprise source data from the multiple cloud-based systems, wherein the enterprise source data comprise service request information, enterprise resource planning (ERP) data associated with the enterprise, master data management (MDM) data associated with the enterprise, information pertaining to one or more internal enterprise applications, information pertaining to one or more enterprise cloud-based applications, and data derived from one or more external data sources;

compiling user device data from multiple user devices connected through one or more networks associated with the enterprise, wherein the user device data comprise unstructured data from storage devices at user device locations;

determining, for multiple enterprise users, one or more user-specific parameters related to data access and one or more user-specific parameters related to enterprise resources, wherein the one or more user-specific parameters related to enterprise resources comprise install bases attributed to the multiple enterprise users, wherein the install bases represent measures of a number of units of one or more products and/or one or more services in use in connection with the multiple enterprise users;

building user profiles for the multiple enterprise users based on the determined user-specific parameters related to data access and the determined user-specific parameters related to enterprise resources;

generating an interactive user-specific output of at least a portion of the enterprise source data and at least a portion of the user device data for at least one of the multiple enterprise users based on the user profiles, wherein generating the interactive user-specific output comprises providing user capabilities, via the interactive user-specific output, including managing open service requests, viewing current state of enterprise hardware, viewing current state of enterprise software products, viewing one or more data center recommendations pertaining to improving utilization of enterprise hardware and enterprise software products, viewing multiple performance metrics, and configuring multiple mobile alerts for service requests, performance metrics, and technician-related information; and rendering the generated interactive user-specific output accessible to the at least one of the multiple enterprise users via one or more mobile-based applications, wherein the one or more mobile-based applications provide access to at least some of the enterprise source data and user device data in the generated user-specific output through voice-based capabilities in connection with at least one mobile device associated with the at least one enterprise user, and wherein the access provided, to the at least one enterprise user, to the at least some of the enterprise source data and user device data in the generated user-specific output is based at least in part on one or more security roles defined for the at least one enterprise user;

wherein the method is implemented in at least one processing platform configured to include a plurality of processing devices each comprising a processor coupled to a memory; and wherein the at least one processing platform is configured to implement at least a portion of the multiple cloud-based systems.

9. The method of claim 8, further comprising:

displaying the interactive user-specific output via a user interface of one or more mobile devices in connection with the one or more mobile-based applications.

10. The method of claim 8, further comprising:
generating one or more customizable alerts for the multiple enterprise users based on the user profiles and one or more pre-defined status updates with respect to at least one of at least a portion of the enterprise source data and at least a portion of the user device data.

11. The method of claim 8, wherein the user device data comprise upgrade statuses attributed to at least one of the multiple user devices.

12. The method of claim 8, wherein the one or more user-specific parameters related to data access comprises one or more data permissions associated with the multiple enterprise users.

13. The method of claim 8, wherein the one or more networks comprises an Internet of things network, and wherein the multiple user devices comprise multiple Internet of things-enabled user devices.

14. The method of claim 8, wherein the user device data comprise performance information attributed to at least one of the multiple user devices.

15. A computer program product comprising a non-transitory processor-readable storage medium having stored therein program code of one or more software programs, wherein the program code when executed by at least one processing platform comprising a plurality of processing devices causes the at least one processing platform:
to compile enterprise source data from the multiple cloud-based systems, wherein the enterprise source data comprise service request information, enterprise resource planning (ERP) data associated with the enterprise, master data management (MDM) data associated with the enterprise, information pertaining to one or more internal enterprise applications, information pertaining to one or more enterprise cloud-based applications, and data derived from one or more external data sources;
to compile user device data from multiple user devices connected through one or more networks associated with the enterprise, wherein the user device data comprise unstructured data from storage devices at user device locations;
to determine, for multiple enterprise users, one or more user-specific parameters related to data access and one or more user-specific parameters related to enterprise resources, wherein the one or more user-specific parameters related to enterprise resources comprise install bases attributed to the multiple enterprise users, wherein the install bases represent measures of a number of units of one or more products and/or one or more services in use in connection with the multiple enterprise users;
to build user profiles for the multiple enterprise users based on the determined user-specific parameters related to data access and the determined user-specific parameters related to enterprise resources;
to generate an interactive user-specific output of at least a portion of the enterprise source data and at least a portion of the user device data for at least one of the multiple enterprise users based on the user profiles, wherein generating the interactive user-specific output comprises providing user capabilities, via the interactive user-specific output, including managing open service requests, viewing current state of enterprise hardware, viewing current state of enterprise software products, viewing one or more data center recommendations pertaining to improving utilization of enterprise hardware and enterprise software products, viewing multiple performance metrics, and configuring multiple mobile alerts for service requests, performance metrics, and technician-related information; and
to render the generated interactive user-specific output accessible to the at least one of the multiple enterprise users via one or more mobile-based applications, wherein the one or more mobile-based applications provide access to at least some of the enterprise source data and user device data in the generated user-specific output through voice-based capabilities in connection with at least one mobile device associated with the at least one enterprise user, and wherein the access provided, to the at least one enterprise user, to the at least some of the enterprise source data and user device data in the generated user-specific output is based at least in part on one or more security roles defined for the at least one enterprise user;
wherein the at least one processing platform is configured to implement at least a portion of the multiple cloud-based systems.

16. The computer program product of claim 15, wherein the program code further causes the at least one processing platform:
to display the interactive user-specific output via a user interface of one or more mobile devices in connection with the one or more mobile-based applications.

17. The computer program product of claim 15, wherein the program code further causes the at least one processing platform:
to generate one or more customizable alerts for the multiple enterprise users based on the user profiles and one or more pre-defined status updates with respect to at least one of at least a portion of the enterprise source data and at least a portion of the user device data.

18. The computer program product of claim 15, wherein the user device data comprise upgrade statuses attributed to at least one of the multiple user devices.

19. The computer program product of claim 15, wherein the one or more user-specific parameters related to data access comprises one or more data permissions associated with the multiple enterprise users.

20. The computer program product of claim 15, wherein the one or more networks comprises an Internet of things network, and wherein the multiple user devices comprise multiple Internet of things-enabled user devices.

* * * * *